United States Patent [19]
Lacey, Jr.

[11] Patent Number: 5,195,765
[45] Date of Patent: Mar. 23, 1993

[54] PAPER SACK HOLDING DOLLY WITH TOP ENTRY GUIDE AND BAG TOP TO GUIDE SHANK HOLDING STRAP

[76] Inventor: Harvey W. Lacey, Jr., 2925 Monarch, Plano, Tex. 75074

[21] Appl. No.: 779,044

[22] Filed: Oct. 18, 1991

[51] Int. Cl.$^5$ .............................................. B62B 1/06
[52] U.S. Cl. ................................. 280/47.26; 248/98; 248/99; 248/101; 248/129; 280/47.27
[58] Field of Search .............. 280/47.26, 47.17, 47.19, 280/47.24, 47.27; 248/129, 98, 99, 101, 907

[56] References Cited

U.S. PATENT DOCUMENTS

| | | | |
|---|---|---|---|
| 191,502 | 5/1977 | Wing | 248/98 |
| 246,667 | 9/1881 | Draper | 248/98 |
| 875,847 | 1/1908 | Peterson et al. | 248/98 |
| 1,254,371 | 1/1918 | Smith | 248/101 |
| 3,260,488 | 7/1966 | Kliewer et al. | 248/99 |
| 3,893,699 | 7/1975 | Morris | 248/98 |
| 5,048,778 | 9/1991 | Wright | 248/98 |

FOREIGN PATENT DOCUMENTS 2647094 11/1990 France ............................. 248/907

Primary Examiner—Eric D. Culbreth
Attorney, Agent, or Firm—Warren H. Kintzinger

[57] ABSTRACT

A paper sack carrying wheeled dolly is provided having a bottom platform supporting the bottom of a biodegradable paper sack such as is now required by some municipalities in their recycling programs. The upright frame of the dolly has a rearwardly extended top handle portion and mounts a top entry guide extending forwardly therefrom vertically aligned with the bottom platform with a bottom shank sized to fit within the top of the paper sack. A retainer strap having opposite ends fastened to opposite sides of the top of the frame has resiliently deflectable convex portions cam action latch tightened on opposite sides and the front of a bag at the top against the bag entry shank of the top entry guide.

12 Claims, 3 Drawing Sheets

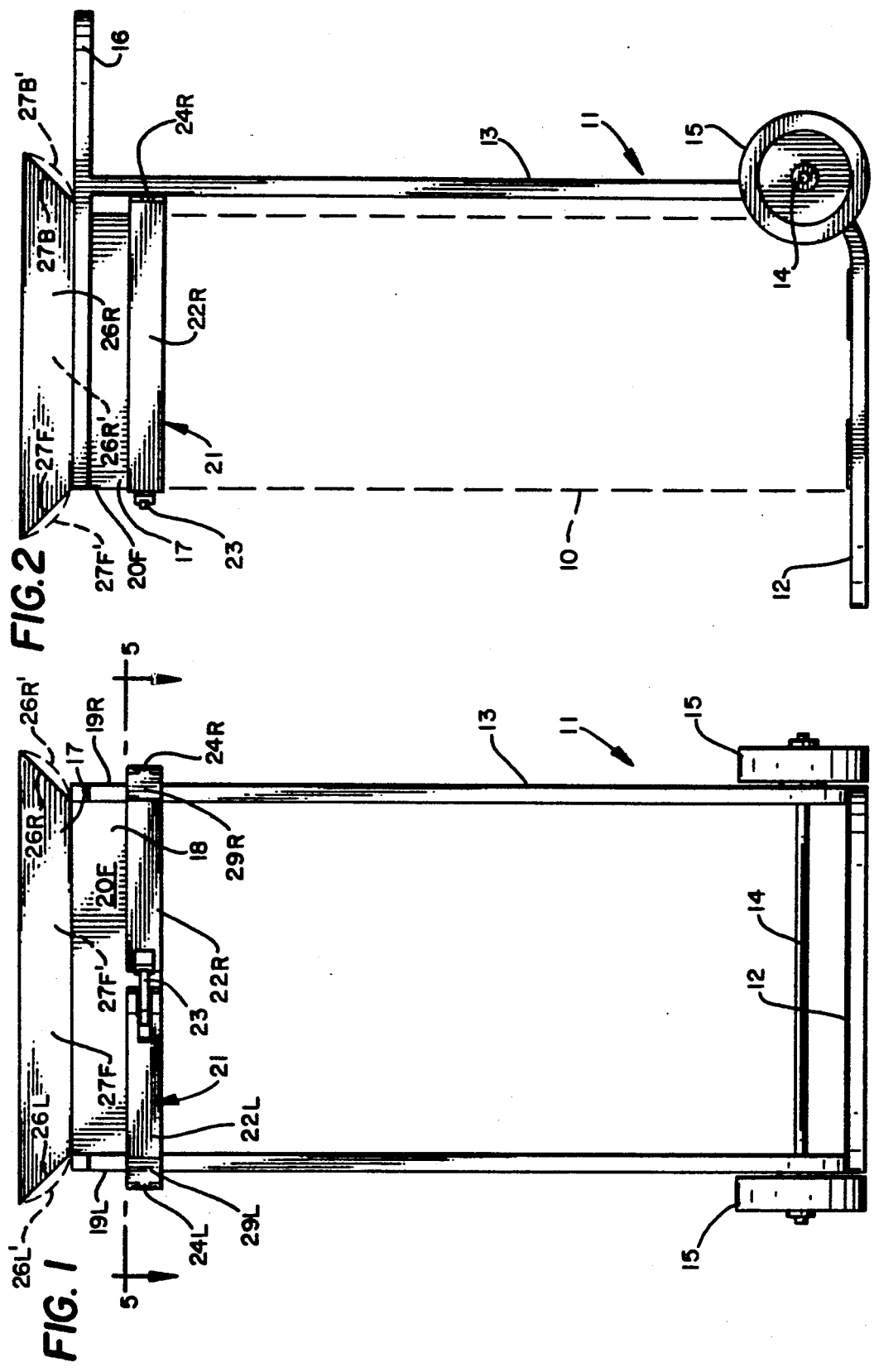

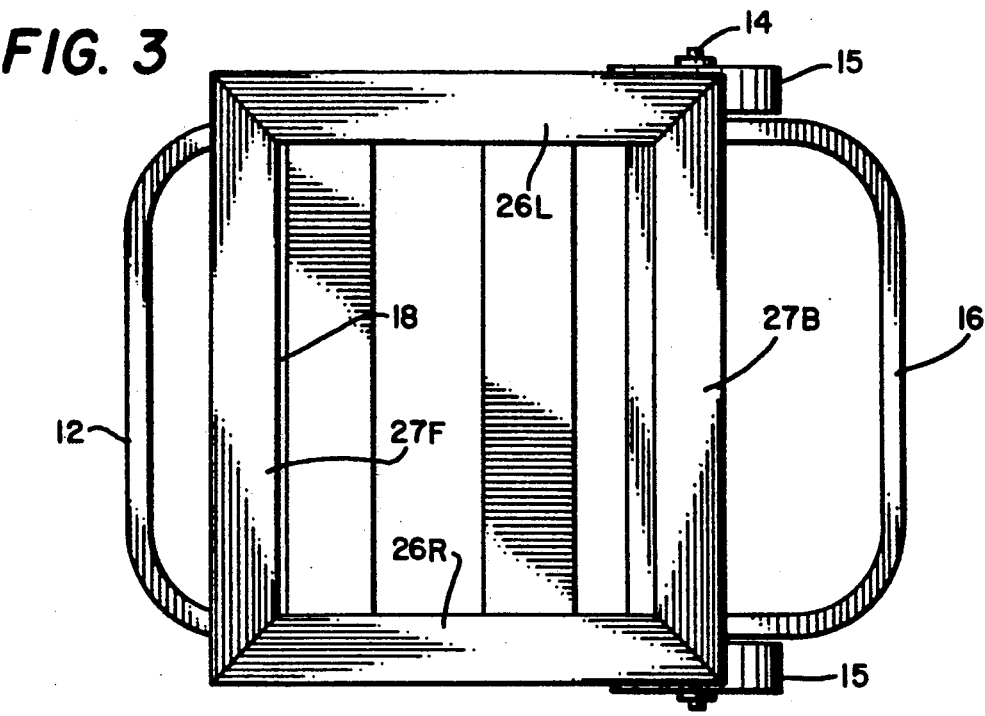
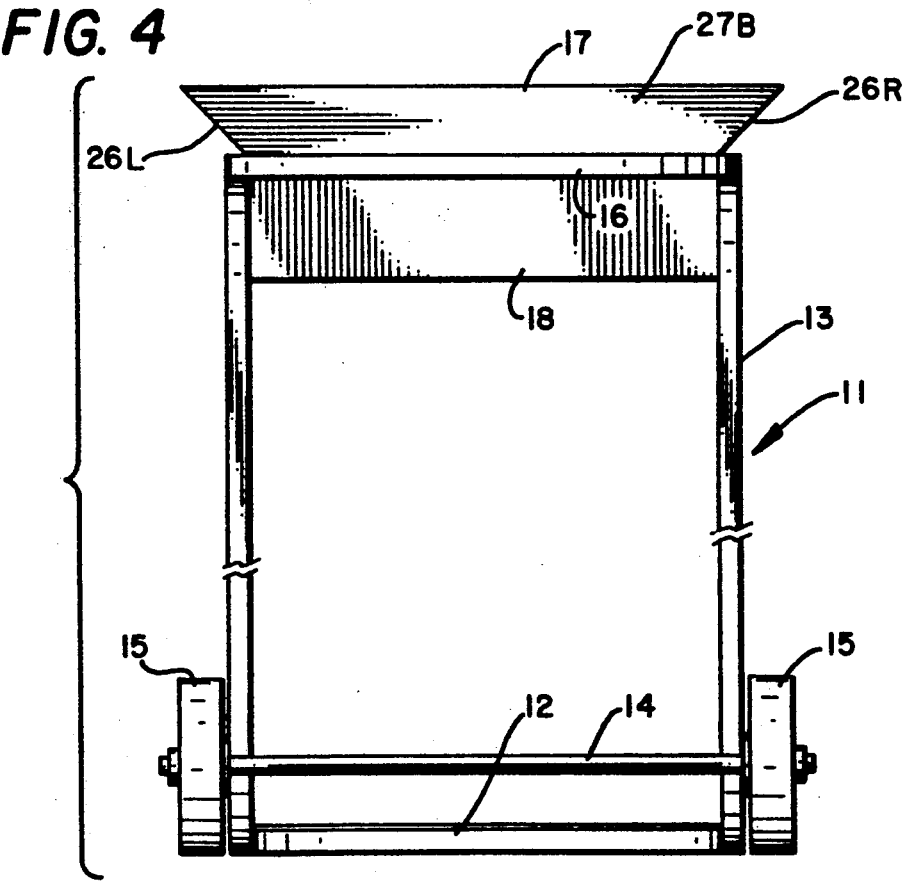

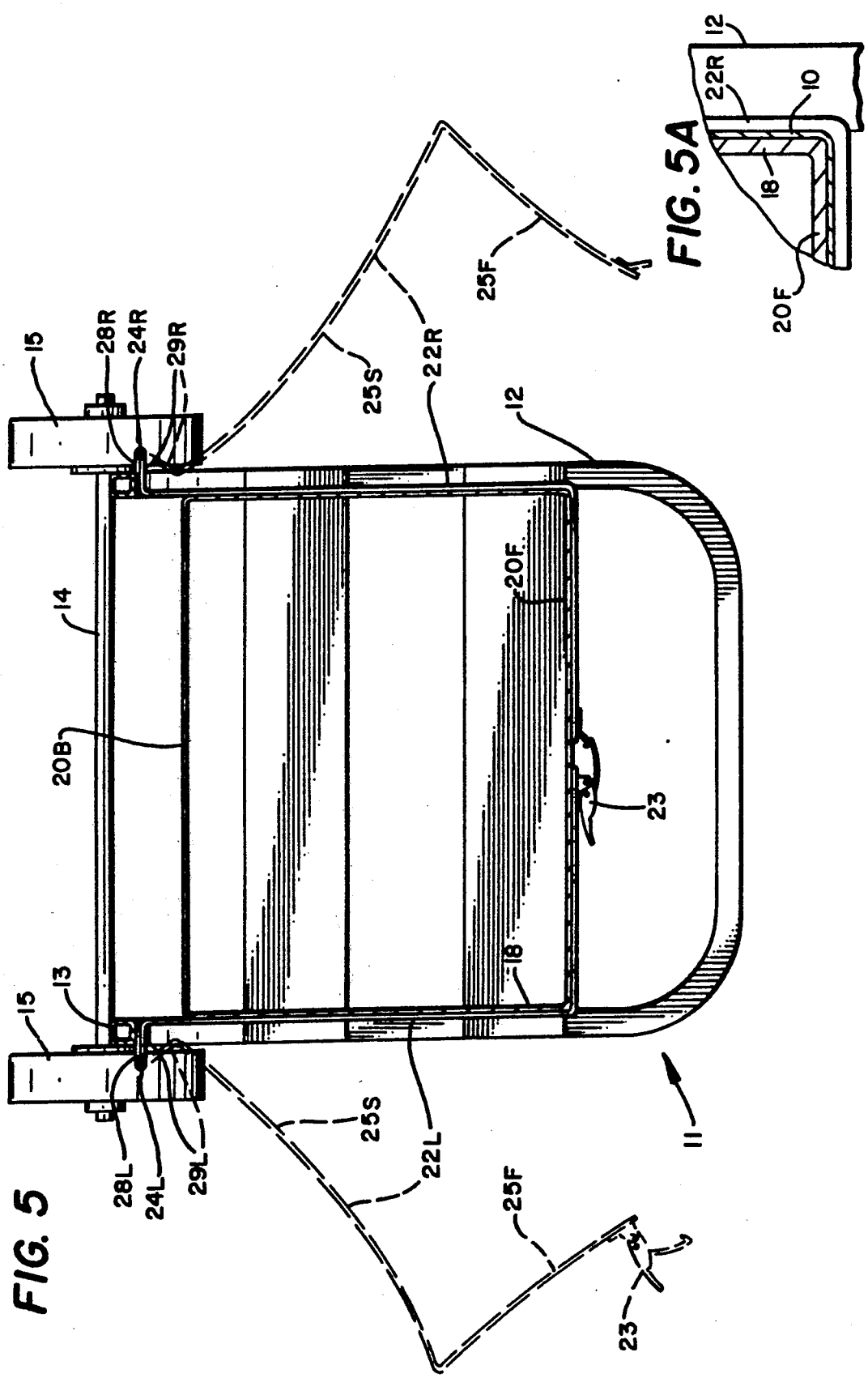

PAPER SACK HOLDING DOLLY WITH TOP ENTRY GUIDE AND BAG TOP TO GUIDE SHANK HOLDING STRAP

This invention relates in general to containers used for trash and grass clippings disposal, and more particularly, to a biogradeable paper sack holding wheeled dolly with a top entry guide and a bag top to guide shank holding strap.

Trash disposal is becoming more and more troublesome with many municipalities running out of land fill and other trash disposal areas. Further, there are many items in trash today that are virtually indestructible plastic items and plastic sacks and even baby diapers with plastic being a constituent part thereof. With plastic creating so many problems in the dump heap many city municipalities are now imposing a requirement that residents use biodegradeable paper sacks for their disposal waste as part of their waste disposal and recycling programs. Such paper sacks cost more, tear easier and are more awkward to use in holding the sacks without tearing or collapsing when they are being filled and being moved from one location to another.

It is therefore a principal object of this invention to provide a convenience holder for biodegradable paper sacks supporting them at the bottom and holding the sack top open with a top entry guide and guide shank holding shank structure.

Another object is to lessen plastic content in trash dumps.

A further object is to increase the proportion of biogradeable material content in dump heaps.

Still another object is to provide a wheeled dolly paper bag holding structure making paper bag filling easier and more efficient and the moving of a filled bag from one location to another easier and safer.

Features of the invention useful in accomplishing the above objects include, in a biodegradable paper bag holding dolly with a top entry guide and bag top to guide shank holding strap, a paper bag carrying wheeled dolly having a bottom platform supporting the bottom of a biodegradable paper bag such as is now required by some municipalities in their recycling programs. The upright frame of the dolly has a rearwardly extended top handle portion and mounts a top entry guide extending forwardly therefrom vertically aligned with the bottom platform with a bottom shank sized to fit within the top of the paper sack. A retainer strap having opposite ends fastened to opposite sides of the top of the frame has resiliently deflectable convex portions cam latch tightened on opposite sides and the front of a bag at the top against the bag entry shank of the top entry guide. The top entry guide has an upper four sided recurved slanted wall enlarged funnel top portion that in addition to being an entry guide has a shock absorbing action resisting breakage when struck by a grass catcher or trash can being dumped therein.

A specific embodiment representing what is presently regarded as the best mode of carrying out the invention is illustrated in the accompanying drawings.

In the drawings:

FIG. 1 represents a front elevation view of the paper sack holding dolly with top entry guide and bag top to guide shank holding strap;

FIG. 2, a side elevation view of the paper sack holding dolly;

FIG. 3, a top plan view of the paper sack holding dolly;

FIG. 4, a back elevation view of the paper sack holding dolly; and,

FIGS. 5 and 5A, a top plan view of the paper sack holding dolly with the bag top to guide shank holding strap unfastened and showing the resiliently deflected bow in each strap section, and an enlarged corner view.

Referring to the drawings:

With reference to FIGS. 1-5 a paper sack 10 carrying dolly 11 is provided having a bottom platform 12 and an upright rear frame 13 and to the rear from platform 12 an axle 14 mounted on the rear of the bottom of the upright rear frame 13 so that axle mounted opposite side wheels 15 have their bottoms in alignment with the bottom of said bottom platform 12 with the dolly 11 platform 12 resting on a supporting surface. The upright rear frame 13 of the dolly 11 has, at the frame top, a rearwardly extended top "U" shaped handle portion 16 and also mounts, forwardly therefrom, a top entry guide 17. The top trash entry guide 17 is vertically aligned with the bottom platform 12 and has a bottom rectangular shank 18 with opposite sides 19L and 19R and front and back sides 20F and 20B sized to fit within the rectangular open top of the paper sack 10 (or reuseable heavy plastic bag). A retainer strap 21 has two opposite side sections 22L and 22R interconnectable by a cam latch structure 23 and with each mounted by opposite end frame mounted hinges 24L and 24R to opposite sides of the top of the rear frame lower than the top handle portion 16. The two strap opposite side sections 22L and 22R each have two resiliently deflectable convex portions 25S and 25F engaging, respectively, opposite the sides and the front of the bag 10 and are cam latch 23 tightened against the bag 10 entry shank 18 of the top entry guide 17. Further, above bag 10 entry 18 top entry guide 17 has an upper four sided slanted wall 26L, 26R, and 27F and 27R enlarged trash entry funnel top 28 that in addition to being an entry guide has a shock absorbing action resisting breakage when struck by a grass catcher or trash can being dumped therein. As an alternate the funnel top could have four curved slanted walls 26L', 26R', 27F' and 27R' as indicated in phantom in FIGS. 1 and 2 to further enhance shock absorbing action resisting breakage when struck by a grass catcher or trash can deing dumped therein.

It should be noted that with the retainer strap two opposite side sections 22L and 22R mounting hinges 24L and 24R the hinge pivot centers are sufficiently far outwardly on the hinge mounting extensions 28L and 28R that closing movement of the strap sections 22L and 22R adjacent to the hinge flanges 29L and 29R thereof is primarily a closing action rather than a sliding shear force action on the bag 10.

Whereas this invention has been described with respect to a preferred embodiment thereof, it should be realized that various changes may be made without departure from the essential contributions to the art made by the teachings hereof.

I claim:

1. A bag holding dolly comprising: a bag carrying dolly having a bottom platform supporting the bottom of a paper bag carried thereby; an upright frame extended upwardly from the rear of said bottom platform and having two opposite sides: a top entry guide mounted on said upright frame and extended forwardly from the top of said upright frame in vertical alignment with said bottom platform; said top entry guide including a four rectangular sided bottom shank sized to fit within the top of a bag carried by said dolly; and a bag top retainer strap having opposite ends fastened to said opposite sides of the top of said upright frame and with the bag top retainer strap having two opposite side portions interconnected by a latch tightening the bag top against the opposite sides and the front of the four rectangular sided bottom shank of said top entry guide; and wherein said bag top retainer strap opposite side portions each have an inwardly directed resiliently deflectable convex bend toward said top entry guide bottom shank; and front engaging sections of said bag top retainer strap opposite side portions each have an inwardly directed resiliently deflectable convex bend toward said top entry guide bottom shank when moved to a latch engaging state.

2. The bag holding dolly of claim 1, wherein said two opposite side portions of said bag top retainer strap each have a pivot hinge mounting to a side of said two opposite sides of said upright frame of the top of said upright frame.

3. The bag holding dolly of claim 1, wherein said latch is a cam latch tightening said retainer strap on the bag top against opposite sides and the front of the four rectangular sided bottom shank of said top entry guide.

4. The bag holding dolly of claim 3, wherein said pivot hinge mountings of said two side opposite portions of said bag top retainer strap include off-set hinge mountings with the hinge pivot centers spaced outwardly of the respective planes of contact of the strap side portions against the bag opposite sides and the opposite sides of said four rectangular sided bottom shank of said top entry guide.

5. The bag holding dolly of claim 4, wherein said top entry guide includes an upper four sided slanted wall enlarged trash entry funnel top above and leading to said four rectangular sided bottom shank of said top entry guide.

6. The bag holding dolly of claim 5, wherein said top entry guide upper four sided slanted walls in the enlarged trash entry funnel top are four curved slanted walls.

7. The bag holding dolly of claim 5, wherein an axle is mounted on the rear of said upright rear frame near the bottom thereof; and opposite side wheels mounted on opposite ends of said axle engage with a supporting surface substantially coplanar with the bottom of said bottom platform.

8. The bag holding dolly of claim 1, wherein said pivot hinge mountings of said two opposite side portions of said bag top retainer strap include off-set hinge mountings with hinge pivot centers spaced outwardly of the respective planes of contact of the strap side portions against the bag opposite sides and the opposite sides of said four rectangular sided bottom shank of said top entry guide.

9. The bag holding dolly of claim 1, wherein said top entry guide includes an upper four sided slanted wall enlarged trash entry funnel top above and leading to said four rectangular sided bottom shank of said top entry guide.

10. The bag holding dolly of claim 9, wherein said top entry guide upper four sided slanted walls in the enlarged trash entry funnel top are four curved slanted walls.

11. The bag holding dolly of claim 9, wherein said upright frame of the dolly has a rearwardly extended top handle portion.

12. The bag holding dolly of claim 11, wherein an axle is mounted on the rear of said upright rear frame near the bottom thereof; and opposite side wheels mounted on opposite ends cf said axle engage with a supporting surface substantially coplanar with the bottom of said bottom platform.

* * * * *